E. BUGATTI.
ENGINE VALVE.
APPLICATION FILED FEB. 15, 1917.

1,254,976.

Patented Jan. 29, 1918.
2 SHEETS—SHEET 2.

Inventor:
Ettore Bugatti
By Attorneys,
Fraser, Tuck & Myers

UNITED STATES PATENT OFFICE.

ETTORE BUGATTI, OF PARIS, FRANCE.

ENGINE-VALVE.

1,254,976. Specification of Letters Patent. Patented Jan. 29, 1918.

Application filed February 15, 1917. Serial No. 148,770.

*To all whom it may concern:*

Be it known that I, ETTORE BUGATTI, a subject of the King of Italy, residing in Paris, France, have invented certain new and useful Improvements in Engine-Valves, of which the following is a specification.

Engine valves are known having a perforated stem to facilitate the cooling of the valve by means of air, but since the cooling air is not circulated the results attained are not satisfactory.

The present invention relates to an improved cooled engine valve having an internal circulation of cooling fluid, such as air or oil.

The accompanying drawings illustrate the invention.

Figure 1:
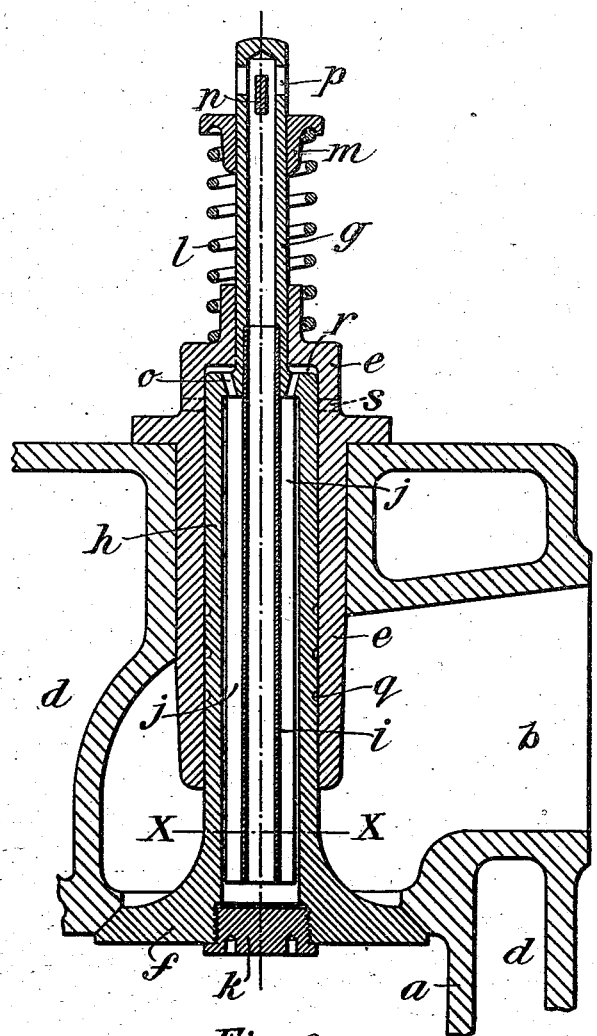
Figure 1 is a vertical section, drawn to an enlarged scale of a valve cooled by circulation of air, and of the valve seat.
Figure 2:
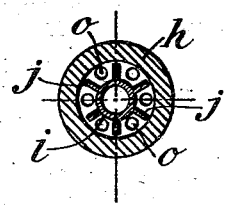
Fig. 2 is a horizontal section on line X—X of Fig. 1.

Referring to Fig. 1, $a$ is the cylinder of the engine, $b$ the exhaust or admission duct, $c$ the valve seat, $d$ the water jacket of the cylinder, $e$ the guiding sleeve for the valve, and $f$ the valve cooled by internal circulation of air.

The valve stem has an axial bore and is internally and externally of two diameters as at $g$ and $h$. The axial bore in $g$, the part of smaller diameter, is extended into the bore of the other part $h$ by a copper tube $i$ having radial wings $j$ and terminating within a short distance of a stopper $k$ which closes hermetically the lower end of the bore in the part $h$.

The valve stem is also perforated as at $o$ and $p$ to permit circulation of the air for cooling, and has stuffing grooves $q$. The perforations $o$ alternate with the wings $j$, thus constituting around the tube $i$ a number of separate ducts insuring satisfactory distribution of the air within the valve stem.

The valve is returned to its seat by a spring $l$ compressed between the guide sleeve $e$ and a collar $m$ retained on the part $g$ by a key $n$. The valve is controlled in any known manner.

The air circulates as follows:—

Since the valve stem has parts $g$ and $h$ of different diameter the space $r$ between the stem and the guide sleeve $e$ becomes the chamber of a pump into which air is drawn every time the valve opens and from which air is expelled suddenly every time the valve closes; this air passes in from the outside air through perforations $p$, tube $i$, the ducts between the wings $j$ and perforations $o$, the air taking the reverse course in passing out.

To produce a more active circulation of cold air, there may be passages, shown in dotted lines at $s$, in the guide sleeve $e$ which are uncovered after the valve has performed a portion of its opening stroke so that air enters directly into the chamber $r$ and is expelled by way of $o$, $j$, $i$ and $p$ when the passages $s$ have been covered during the closing stroke of the valve.

Figure 3:
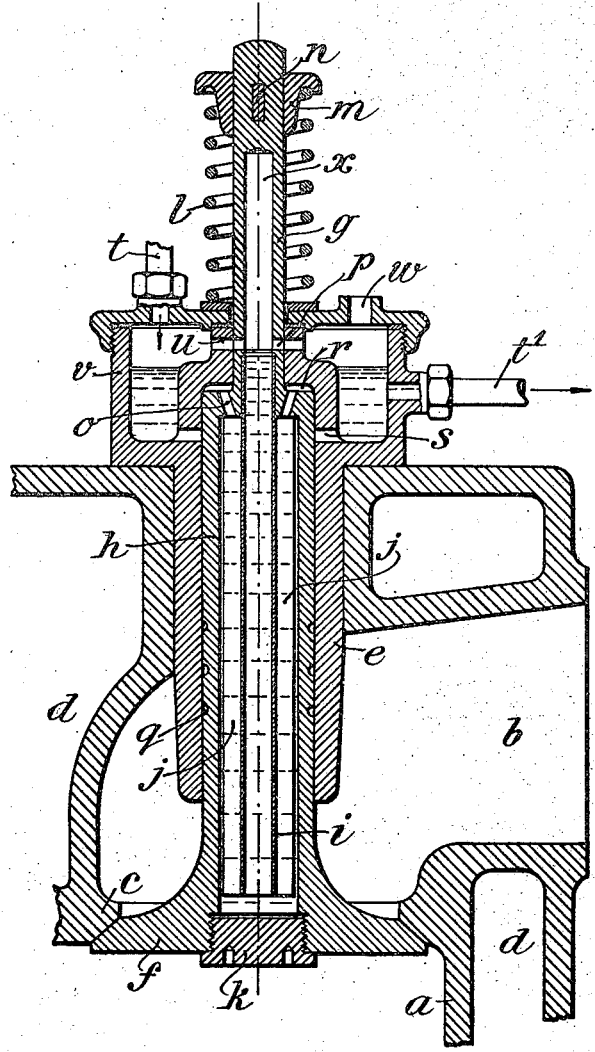
Fig. 3 is a vertical section, drawn to an enlarged scale of a valve cooled by circulation of oil, and of the valve seat.

In the form shown in Fig. 3 the general construction of the valve is the same as that shown in Fig. 1, but there is added an oil reservoir $v$, provided or not with a pipe $t$ for supplying it with cold oil and a pipe $t'$ for the exhaust of heated oil. The reservoir is in permanent communication with the atmosphere through passage $w$.

The perforations $p$ are much lower down the part $g$ of the stem than in the case of Fig. 1, being adapted when the valve is closed to register with perforations $u$ in the upper part of the guide sleeve $e$ situated above the level of the oil in the reservoir $v$ which surrounds this part of the sleeve.

The operation is as follows:—

When the valve is opened the pressure falls in chamber $r$ inducing a flow of oil through perforations $s$, as soon as the latter are uncovered. When the valve closes the oil confined in chamber $r$ is expelled through perforations $o$, the interior of the valve stem, which it cools, and up the tube $i$, compressing air in the space $x$. When perforations $p$ register with perforations $u$ oil is expelled, by the pressure in $x$, into the reservoir $v$ wherein the pressure is always that of the atmosphere.

The compression which occurs in chamber $r$ and space $x$ (Fig. 3) or in chamber $r$ (Fig. 1) has also the effect of damping the shock with which the spring $l$ returns the valve to its seat $c$.

Having thus described my invention and the best means I know of carrying the same into practical effect, I claim:—

1. An engine valve having an axially bored reciprocating stem of two diameters, a sleeve wherein the part of larger diameter moves as a piston, perforations in the part of larger diameter for passage of cooling fluid between the interior of the sleeve and the interior of the stem, perforations in the part of smaller diameter for passage of cooling fluid between an external source and the interior of the stem, a tube extending the bore of the part of smaller diameter into the bore of the part of larger diameter and partitions in the space between the said tube and the internal face of the axial bore of the part of larger diameter.

2. An engine valve having an axially bored reciprocating stem of two diameters, a sleeve wherein the part of larger diameter moves as a piston, perforations in the part of larger diameter for passage of cooling fluid between the interior of the sleeve and the interior of the stem, perforations in the part of smaller diameter for passage of cooling fluid between an external source and the interior of the stem, a tube extending the bore of the part of smaller diameter into the bore of the part of larger diameter, partitions in the space between the said tube and the internal face of the axial bore of the part of larger diameter and perforations for passage of fluid between an external source and the interior of the sleeve.

In witness whereof I have hereunto signed my name in the presence of two subscribing witnesses.

ETTORE BUGATTI.

Witnesses:
   CHAS. P. PRESSLY,
   HENRI CARTIER.